United States Patent [19]
Saban et al.

[11] Patent Number: 5,967,252
[45] Date of Patent: Oct. 19, 1999

[54] PUSH BUTTON ACTUATION SYSTEM FOR ATV TRANSMISSION

[75] Inventors: Nisim Saban, Ramat Hasharon; Roni Amir, Ramat Hashavim, both of Israel

[73] Assignee: Uri Rapoport, Moshav Ben-Shemen, Israel

[21] Appl. No.: 08/939,978

[22] Filed: Sep. 29, 1997

[51] Int. Cl.[6] ............ B60K 20/02; B62D 61/08; B62D 41/22
[52] U.S. Cl. .......... 180/336; 180/230; 192/3.61; 74/473.3; 74/473.16; 74/473.12; 74/481; 74/473.15
[58] Field of Search ................. 180/336, 230, 180/78; 74/473.3, 473.16, 473.12, 481; 473.15, 483 PB; 192/3.61, 3.62

[56] References Cited

U.S. PATENT DOCUMENTS

| | | | |
|---|---|---|---|
| 2,094,163 | 9/1937 | Weber | 74/481 |
| 2,552,371 | 5/1951 | Erickson | 192/3.62 |
| 2,600,767 | 6/1952 | Herrell | 192/3.61 |
| 2,936,868 | 5/1960 | Myers | 192/3.63 |
| 3,894,442 | 7/1975 | Hembree | 74/335 |
| 4,459,870 | 7/1984 | Gill | 74/471 XY |
| 5,801,502 | 9/1998 | Monzen | 318/286 |

*Primary Examiner*—J. J. Swann
*Assistant Examiner*—Andrew J. Ririe
*Attorney, Agent, or Firm*—Jones, Day, Reavis & Pogue

[57] ABSTRACT

A push-button actuated system for an ATV transmission such as those used on a Honda 300 where a DC motor is connected to a cable linkage, which in turn is connected to the gear change pedal now used to upshift and downshift gears of a semi-automatic transmission. The cable linkage is arranged so that a clockwise rotation of the DC motor causes a cable to pull upwardly on the gear change pedal. A counterclockwise rotation of the DC motor causes the cable linkage to pull downwardly on the pedal. Variations do away with the pedal and cause rotation of the operative transmission shaft in the same manner as the pedal.

17 Claims, 5 Drawing Sheets

PUSH BUTTON ACTUATION SYSTEM FOR ATV TRANSMISSION

BACKGROUND OF THE INVENTION

1. Field of the Invention

The present invention relates to the means for operating a vehicle transmission and, more particularly, to a push-button actuation system for an ATV transmission which is simple, reliable and rugged.

2. Description of the Related Art

There are several brands of all-terrain vehicles (ATV) on the market today. Some of these vehicles include automatic transmissions, but others, such as the Honda Four Trax 300, have semi-automatic type transmissions. These are generally comprised of three major elements: a clutch which separates the engine from the driving wheels during gear shifting; a centrifugal mechanism which disengages the engine from the driving wheels so as to enable a complete stop of the ATV while in gear; and a gear engagement mechanism which allows sequential shifting. To shift gears, a driver must lift up on a gear change pedal to cause an upshift and press down on the pedal to cause a downshift.

At certain times, under certain conditions or for people with certain disabilities, it is difficult or impossible for a driver to manipulate the pedal. For example, in uneven terrain a driver may have difficulty in locating the toe of his/her shoe under the pedal because ground clearance is insufficient. For the same reason there may be difficulty in depressing the pedal. As another example, after a long day of driving an ATV, fatigue makes it physically difficult to continue shifting the transmission. Also, individuals with leg disabilities are unable to operate semi-automatic ATV transmissions if they are unable to move their legs.

The use of a gear change pedal also raises safety problems. Use of the pedal is awkward. Stability also is a question. An operator is more stable when he/she has his/her feet firmly placed on stationary pads or bars. When one foot must also be used for shifting, a driver's balance is adversely affected.

Prior attempts to solve these problems have yielded automatic transmissions but these are relatively complex, expensive and not as reliable as a semi-automatic transmission. Thus, an optimal system has yet to be produced.

BRIEF DESCRIPTION OF THE INVENTION

The difficulties encountered by previous workers in the field have been overcome by the present invention. What is described here is a push-button actuation system for a vehicle transmission comprising in combination, a vehicle, an actuator connected to the vehicle for manipulation by an operator, a power source mounted to the vehicle, a secondary motor connected to the vehicle operatively connected to the power source and movable in response to the operation of the actuator, a transmission mounted to the vehicle and a linkage mounted to the vehicle for transmitting movement from said secondary motor to the transmission.

An object of the present invention is to provide a push-button actuation system for a transmission which is simple, reliable and relatively inexpensive. Another advantage of the present invention is that it provides a push-button actuated system for a transmission which is rugged and easy to use. A further aspect of the present invention is to provide a push-button actuation system for a transmission which may be operated solely by the hand on a driver. Another aim of the present invention to provide a push-button actuation system for a transmission that provides for faster and smoother shifting and that includes the ability to adjust the speed of operation.

A more complete understanding of the present invention and other objects, aspects, aims and advantages thereof will be gained from a consideration of the following description of the preferred embodiments read in conjunction with the accompanying drawings provided herein.

DESCRIPTION OF THE PREFERRED EMBODIMENTS

While the present invention is open to various modifications and alternative constructions, the preferred embodiments as shown in the drawings will be described herein in detail. It is understood, however, that there is no intention to limit the invention to the particular forms disclosed. On the contrary, the intention is to cover all modifications, equivalents and alternatives falling within the spirit and scope of the invention as expressed in the appended claims.

Figure 1:
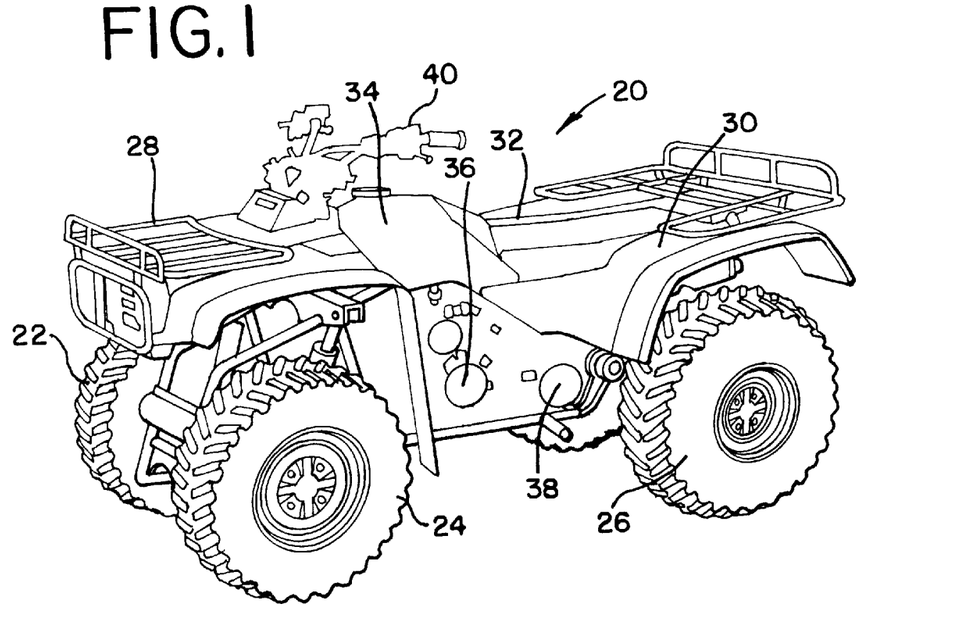
FIG. 1 is a perspective view of an existing all-terrain vehicle.
Figure 3:
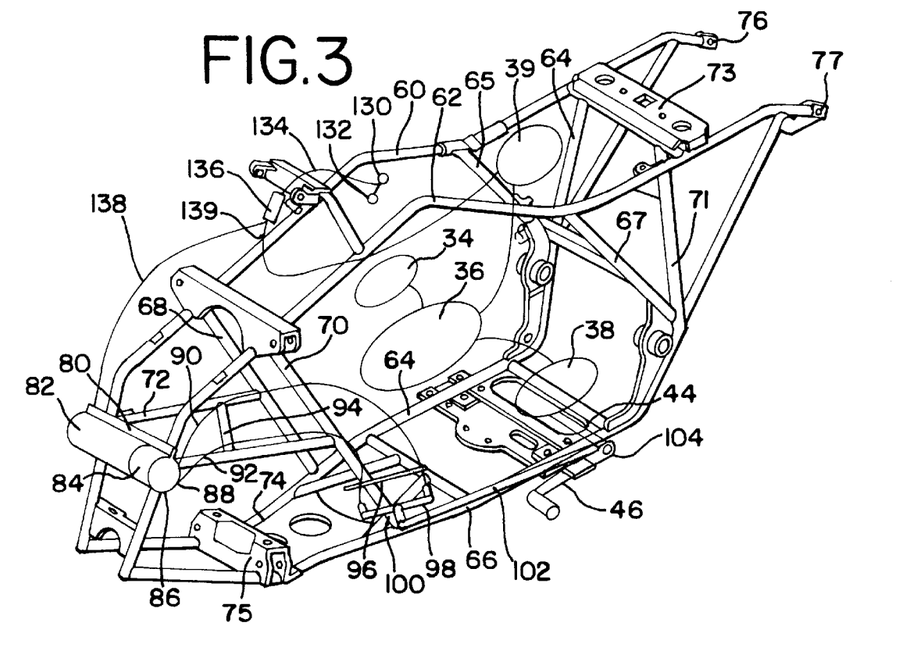
FIG. 3 is a diagrammatic perspective view of an all-terrain vehicle frame showing the placement of the push button actuation system of the present invention.

Referring now to FIGS. 1 and 3, there is shown a typical ATV 20 in the form of a Honda Four Trax 300. The vehicles include four tires of which three tires 22, 24 and 26 are shown. The ATV also includes a front fender housing 28, a rear fender housing 30 and a driver's seat 32. Forward of the seat is a gas tank 34, and beneath the seat is an engine 36, a transmission 38 and a battery 39. Forward of the seat are handlebars 40 for steering the ATV and for mounting operational switches and hand brakes.

Figure 2:
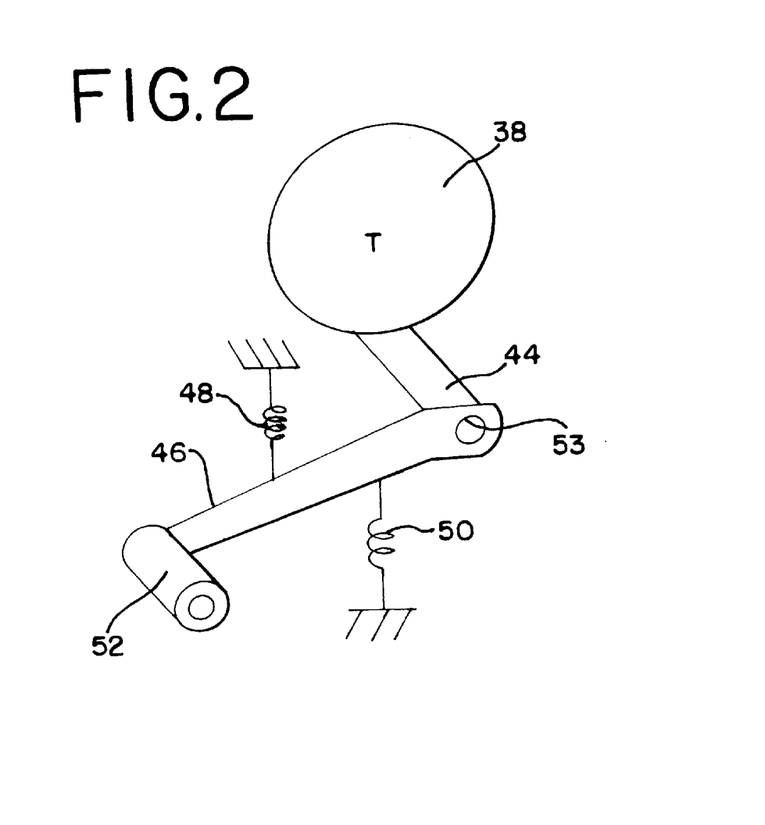
FIG. 2 is a diagrammatic view of an existing gear change pedal attached to a semi-automatic transmission of the type used on all-terrain vehicles.

Referring now to FIG. 2, the existing structure of a foot operated gear change pedal for a semi-automatic transmission of the type used on the Honda ATV is illustrated in diagrammatic form so as to explain its basic operation. The transmission 38 is depicted as an oval, and emanating from the transmission is an operating shaft 44. Mounted to the shaft is a gear change pedal 46 which is spring biased in both the upward and downward directions by springs 48 and 50, respectively. At the cantilevered end of the pedal is a foot plate 52 which allows the pedal to be rotated about a pivot 53 in either a clockwise or a counterclockwise direction depending upon whether the driver of the ATV depresses the pedal downwardly or whether the driver lifts the pedal, typically with the toe of his/her shoe. In an existing ATV, such as the Honda 300, a driver will be able to upshift 5 times from neutral by causing the pedal to rotate in a clockwise direction as the ATV increases speed. After each uplift the spring 50 will cause the pedal to return to its original position. When the ATV is slowing the driver may depress the pedal causing it to pivot and causing the shaft 44 to rotate counterclockwise so as to allow the transmission to downshift into a lower gear and into neutral. Each time the pedal is released it will be returned to its original position by the biasing spring 48. From neutral and fully stopped, the driver may shift the transmission into reverse by holding the hand brake, depressing a specific button and depressing the pedal.

It can now be appreciated that someone with leg injuries or someone who is physically disabled may not be able to operate the pedal at all. It can also be appreciated that a driver who is fatigued may have difficulty in constantly manipulating the pedal. Further, it can be appreciated that safety and stability are desirable objectives in the design of ATVs. Finally, it can also be appreciated that in uneven terrain it is possible that movement of the pedal downwardly may be blocked altogether as might a driver's foot thereby making upshifting impossible or very difficult. These problems are all overcome with the inventive push-button actuation system of the present invention.

Referring back to FIG. 3, a frame for the Honda 300 ATV is illustrated. The frame includes two generally longitudinal upper members 60, 62, two generally longitudinal lower members 64 and 66, two vertical braces 68, 70 connecting respective upper and lower members, two horizontal braces 72, 74, two rear braces 65, 67 and two vertical continuations 69, 71 of the lower members 64, 66, respectively. For purposes of orientation, the seat would be located above a cross brace 73 and extend both fore and aft along the two upper frame members. The front tires would be approximately centered on another cross brace 75 while the rear tires would be disposed aft of the frame about even with but below the aft ends 76 and 77 of the frame. Also shown diagrammatically is the transmission 38, the transmission operating shaft 44 and the gear change pedal 46.

Figures 4, 5:
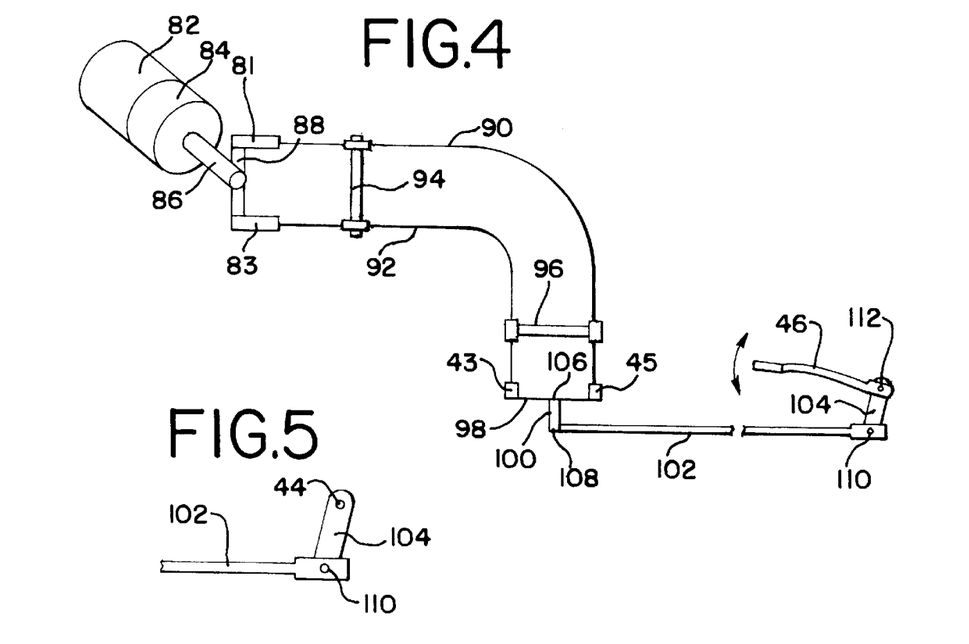
FIG. 4 is a diagrammatic elevational view of a first embodiment of the present invention.
FIG. 5 is a partial diagrammatic elevational view of a second embodiment of the present invention.

In order to appreciate the simple, reliable, rugged yet inexpensive approach taken by the present invention, reference is made to FIGS. 3 and 4. The inventive system is shown in relation to the existing frame. Attached to the upper frame members 60 and 62 is a bracket 80. The bracket may be attached to the frame members in any suitable manner such as by screws, bolts, U-bolts or the like.

Mounted to the bracket is a small 12 volt DC motor 82 and a planetary gear train 84. The output ratio of the gear train is 1:20 and the no-load rpm of the motor is about 70. Attached to the output of the gear train is a rotatable output shaft 86 to which is fastened an arm 88. The arm is a link of a linkage that is connected to and terminates at the gear change pedal 46. At each end of the arm 88 is a pivotal finger, such as the fingers 81 and 83 to which are connected cables, such as an upper cable 90 and a lower cable 92.

Slightly aft of the bracket 80 is a second bracket 94. The combination brackets 80, 94 are connected to the frame member 60 by a U-bolt 91, FIG. 6, and to the upper frame member 62 also by a U-bolt 93, FIG. 7. The bracket 94 supports the two cables in a desirable location by the openings 95 and 97 and helps guide them toward the aft portion of the ATV. The cables bend downwardly and are mounted to a third bracket 96 which is used to guide and align the cables. The third bracket is attached to the vertical brace 70 in any suitable fashion such as with a U-bolt 41. The cables terminate by being attached to another rotatable arm 98. The second arm 98 has pivotal fingers 43, 45 attached at each end. The second arm 98 is pivotally mounted by a fastener 106 to the bracket 96. Downwardly depending from the arm is a link 100 which in turn is pivotally connected to an elongated rod 102. The rod extends in an aftward direction to pivotally connect to another link 104 which in turn is connected to the gear change pedal 46.

The operation and movement of the linkage is simple and straightforward. If the motor 82 rotates the shaft 86 in a counterclockwise direction, the arm 88 moves in the same manner because the arm is fixed to the shaft. A counterclockwise rotation of the arm exerts a force on the cable 90 in a leftward direction as viewed in FIG. 4, which in turn transmits that force to the second arm 98. The second arm 98 pivots around the fastener 106. Because the link 100 is fixed to the arm 98 it will also rotate in a counterclockwise direction pushing the rod 102 through a pivot joint 108 in a rightward direction. The other end of the rod is connected to the link 104 through a pivot joint 110 thereby causing the link 104 to rotate in a counterclockwise direction. The link 104 is attached to the shaft 44 of the transmission by a fastener 112. Because the pedal 46 is also connected to the transmission shaft, the pedal moves downwardly, also in a counterclockwise direction when the shaft rotates.

A rotation of the DC motor in a clockwise direction causes the arm 88 to exert a pulling force on the cable 92 which is transmitted to the second arm 98 causing it to pivot in a clockwise direction. The motion moves the rod 102 to the left. The leftward pull rotates the link 104 in a clockwise direction and causes the pedal 46 to move upwardly, also in a clockwise direction as the transmission shaft rotates. In this fashion, the foot manipulation of the pedal is replaced by the action of the DC motor and the linkage. It is to be noted that the biasing springs for the gear change pedal which already exist as part of the transmission also returns the arms 88 and 98 to their neutral positions. With the design shown, the rotating arm 88 moves approximately 34 degrees. It is also understood that changing the dimensions of the links will alter the speed at which the gears change should this prove desirable.

Referring now to FIG. 5, a "pedalless" variation of the invention is illustrated. There the rod 102 is connected through the pivot joint 110 to the link 104 which is connected to the shaft 44. However, the pedal 46 has been removed.

Figure 6:
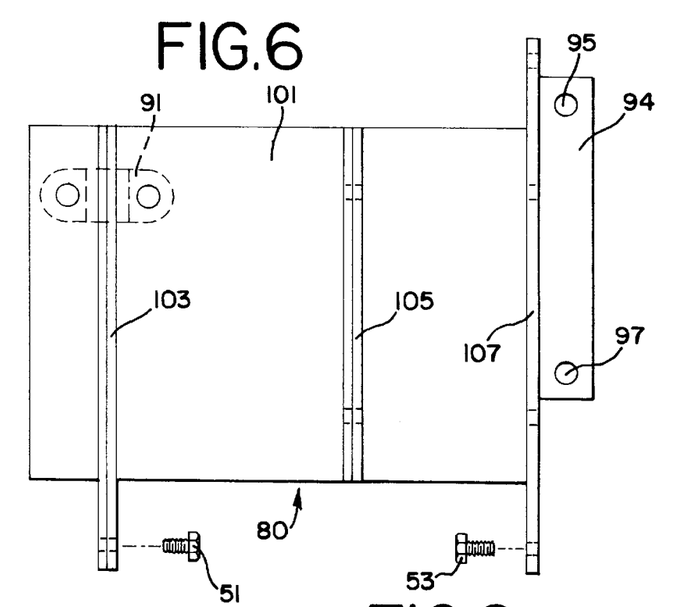
FIG. 6 is a front elevational view of a mounting bracket for a DC motor.
Figure 7:
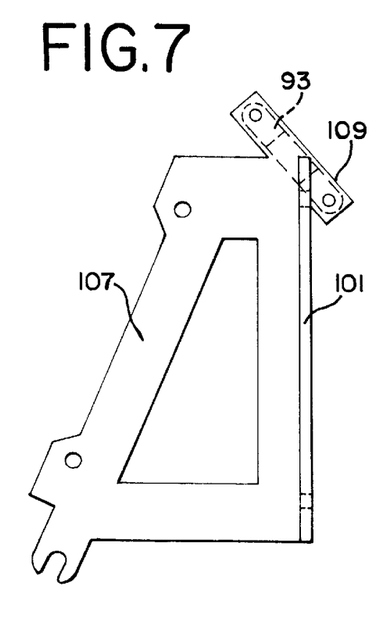
FIG. 7 is a side elevational view of the mounting bracket of FIG. 6.

The mounting bracket 80 is illustrated in FIGS. 6 and 7. The bracket serves as a mounting for the motor 82 and gear 84 combination in the fore portion of the frame which is otherwise clear of any mechanisms. The bracket 80 is also integral with the bracket 94. These brackets are attached to the upper members by any convenient means such as the U-bolts 91 and 93. For example, the integral brackets include a backplate 101, an oblique arm 109, a first flange 103, a second flange 105 and a third flange 107. In addition to the U-bolts, existing bolts 51 and 53 also fasten the brackets to the frame members.

Figure 8:
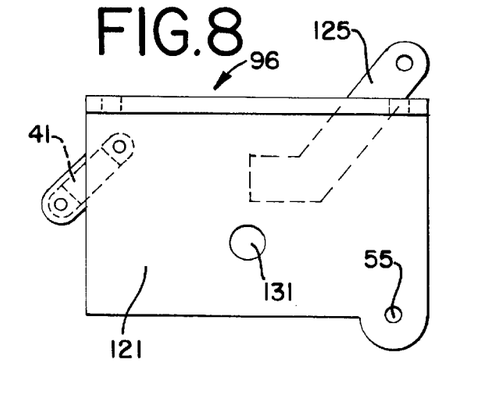
FIG. 8 is a front elevational view of another mounting bracket.
Figure 9:
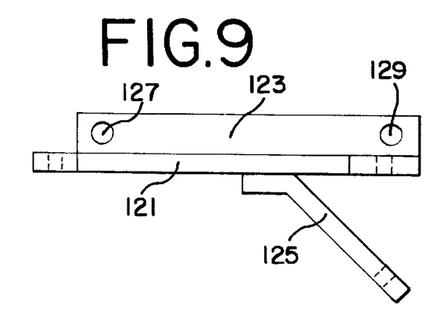
FIG. 9 is a bottom plan view of the mounting bracket of FIG. 8.

The second bracket 96 includes a backplate 121, a first flange 123 and an oblique arm 125. The arm 125 fastens to a frame member (not shown) as does the backplate 121 through opening 55 where a screw may be drilled into a frame member. The bracket supports the cables through two openings 127, 129 and the pivot fastener through the opening 131. The bracket is connected to the brace 70 by the U-bolt 41.

Figures 10, 11, 12:
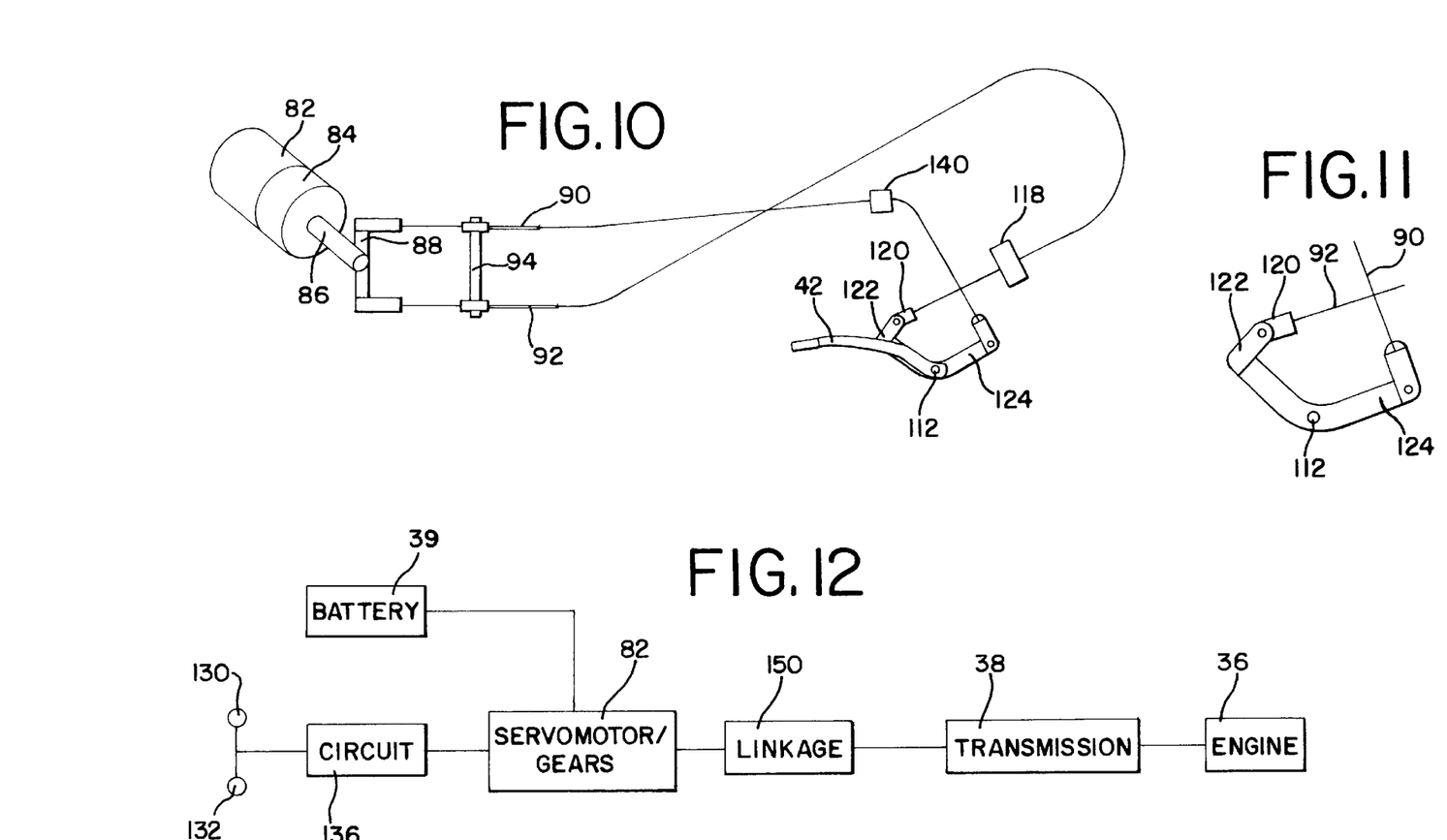
FIG. 10 is a diagrammatic elevational view of a third embodiment of the present invention.
FIG. 11 is a partial diagrammatic elevational view of a fourth embodiment of the present invention.
FIG. 12 is a diagrammatic flow diagram of the operation of the present invention.

Referring now to FIG. 10, there is illustrated a third embodiment of the present invention in which the forward portion of the linkage is identical to that described in relation to FIG. 4. However, the aft portion of the linkage is positioned differently. The cable 92 is attached to a bracket 118 which is connected to the rear brace 67. The bracket guides the cable to a link 120 pivotally connected to a second link 122 which is affixed to the pedal 42. In this arrangement, if the motor rotates the arm 88 in a clockwise direction, the cable 92 transmits this movement to the pedal 42 causing it to move upwardly.

The cable 90 is supported by a bracket 140 attached to the upper member 62. The cable is connected to an L-shaped link 124 which is affixed to the pedal 42. Movement of the motor in a counterclockwise direction pulls on cable 90 which in turn causes the link 124 to rotate counterclockwise causing the transmission shaft to rotate. At the same time the pedal 42 is rotated downwardly.

FIG. 11 shows a fourth variation of the invention. The linkage is identical to that shown in FIG. 6 except that the pedal has been deleted. The links 120, 122 and 124 are sufficient without the pedal to cause rotation of the transmission shaft in response to forces from the cables 90 and 92. The link 124 is attached to the transmission shaft by a fastener 112.

Referring back to FIG. 3, the motor 82 is actuated by an upshift button 130 or a downshift button 132. The buttons are connected by suitable wires 134 to an electrical circuit 136. The circuit is connected by suitable wires 138 to the DC motor 82. The circuit 136 is also connected by suitable wires 139 to the battery, and the battery is also wired to the engine in the usual fashion.

Referring now to FIG. 12, this basic equipment of the present invention is shown in block diagram. The push buttons 130, 132 are connected to the circuit 136 which is powered by the battery 39 and which together power and actuate the DC motor 82. As already explained, the DC motor operates a linkage 150 (described in detail in relation to FIGS. 4, 5, 10 and 11) which in turn operates the transmission and the transmission regulates the engine 36.

Figure 13:
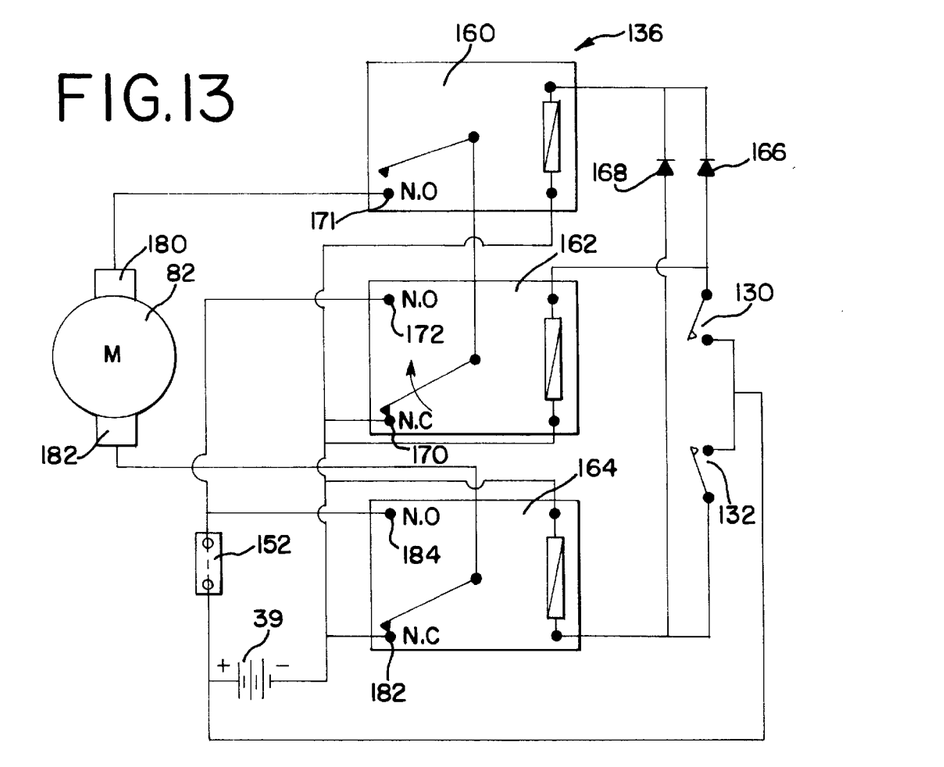
FIG. 13 is a circuit diagram of the electrical connection between the push buttons and the DC motor to operate the linkage of the present invention.

Referring now to FIG. 13, the circuit is illustrated in more detail. The circuit includes the push button switches 130 and 132, three relays 160, 162 and 164, the battery 39 and the motor 82. Also provided are two rectifiers 166 and 168, an automatic circuit breaker 152 and the necessary conductive paths between components. The relay 160 is normally open while the relays 162 and 164 are used in conjunction with the relay 160 to change polarity of the motor. When the push button switch 130 is closed (to cause an upshift), a signal is passed through the rectifier 166 to the relay 160. The relay 160, normally open, closes on contact 171. A signal is also sent to the relay 162 causing that relay to move from a normally closed contact 170 to a normally open contact 172.

The affect of closing the relay 160 and altering the state of the relay 162 causes a signal to be sent from the battery through the contact 172 of the relay 162, through the contact 171 of the relay 160 to a pole 180 of the motor 82. This drives the motor in a clockwise direction.

In an analogous manner, if the push button switch 132 is closed, a signal is sent to the relays 160 and 164. The relay 164 switches from the normally closed contact 182 to the normally open contact 184. A signal passes through contact 184 and to the pole 182 of the motor 82. The signal also passes through the contact 171 and the contact 170 to complete the circuit. A signal passing through rectifier 168 energizes the relay 160. Closing the push-button switch 132 causes the motor to rotate counterclockwise and, thus, cause downshifts and the ability to move in reverse. Relay 160 is normally open to prevent an inadvertent operation of the motor. Having the relay 160 normally open prevents any forces from interfering with the normal action of the biasing springs on the gear change pedal.

Figure 14:
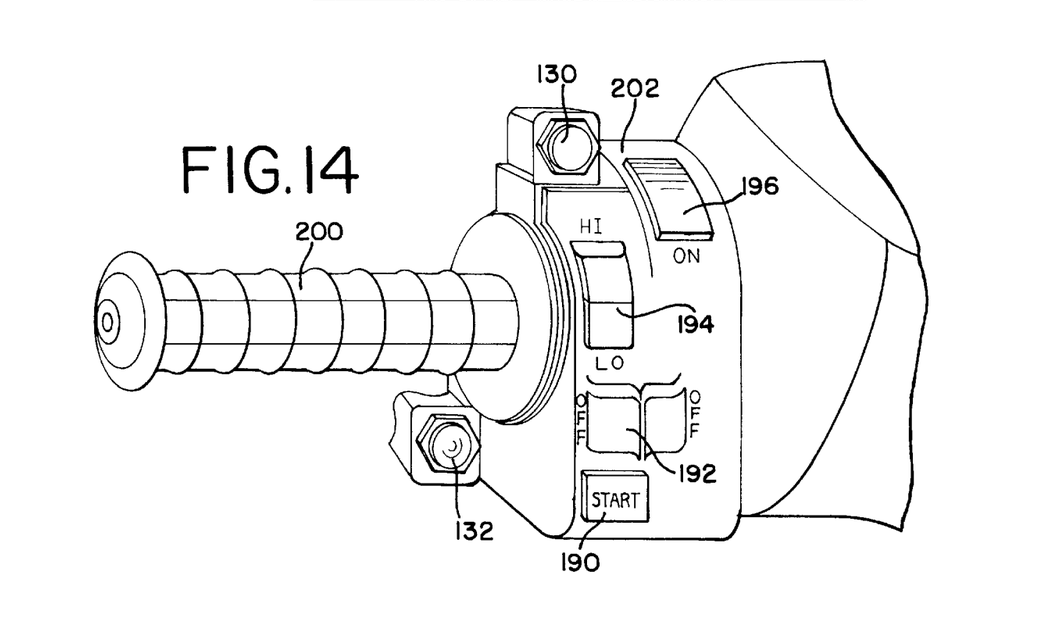
FIG. 14 is a diagrammatic perspective view of the push buttons of the present invention mounted to the handlebars of an ATV.

Referring now to FIG. 14, the push-buttons are illustrated as they might be located on an ATV handlebar. Illustrated is a left handlebar 200 and an electrical housing 202. Mounted to the housing is the upshift push-button 130 and the downshift push-button 132. The other elements are from an existing Honda 300 and include a start button 190, an emergency off-switch 192, a light switch 196 and a high/low beam switch 194.

Using the push-button provides for a much faster and smoother shifting of gears as compared to the present method of having the driver use his/her foot to manipulate the pedal. These are additional advantages of the inventive system.

The Honda ATV has been referenced throughout this application as a specific example of an ATV to which the push-button actuated system may be retrofitted. It is to be understood that the push-button system can also operate with other ATV brands, such as Yamaha, Suzuki, Kawasaki and others. The DC motor is readily available and may be acquired from CMC Company of Chicago, Ill., catalog number 350900000005DECAO. The gear train may be purchased from Warner, Inc. also located in the Chicago area, model number 220763-020.

The specification describes in detail several embodiments of the present invention. Other modifications and variations will, under the doctrine of equivalents, come within the scope of the appended claims. For example, different linkage systems are considered equivalent structures, and altering the geometry or dimensions of the system are equivalent structures. Another equivalent structure is the substitution of a hydraulic motor and reservoir for the DC motor. Still other alternatives will also be equivalent as will many new technologies. Also, the present invention may find use on different vehicles such as motorcycles and scooters. There is no desire or intention here to limit in any way the application of the doctrine of equivalents.

We claim:

1. A push-button actuation system for a vehicle transmission comprising in combination:
   a vehicle;
   an actuator connected to said vehicle for manipulation by an operator;
   a power source mounted to said vehicle;
   a secondary motor connected to said vehicle operatively connected to said power source and movable in response to the operation of said actuator;
   a transmission mounted to said vehicle;

a linkage mounted to said vehicle for transmitting movement from said secondary motor to said transmission; and wherein:

said linkage includes a rotatable arm and two cables, one cable for causing an upshift of gears and the other cable for causing a downshift of gears.

2. A system as claimed in claim 1 wherein:

said linkage includes a second rotatable arm which is connected to said two cables, a rod connected to said second rotatable arm and a link pivotally connected at one end to said rod and connected at the other end to a transmission shaft which causes gear shifting of said transmission.

3. A system as claimed in claim 1 wherein:

said linkage includes two brackets connected to said vehicle and a link having two ends, the link being rotatably connected to a transmission shaft between said two ends, for causing gear shifting of said transmission, one of said cables being mounted to one of said brackets and being connected to one end of said shaft connected link and the other of said cables being mounted to the other of said brackets and being connected to the other end of said shaft connected link.

4. A push-button actuation system for a vehicle transmission comprising in combination:

vehicle;

an actuator connected to said vehicle for manipulation by an operator;

a power source mounted to said vehicle;

a secondary motor connected to said vehicle operatively connected to said power source and movable in response to the operation of said actuator;

a transmission mounted to said vehicle;

a linkage mounted to said vehicle for transmitting movement from said secondary motor to said transmission;

a pedal in operative relationship to said transmission for causing said transmission to shift gears; and wherein said linkage includes a first arm having first and second ends connected to said secondary motor between said first and second ends and being rotatable thereby, a first cable connected to said first end of said first arm, a second cable connected to said second end of said first arm, a first mounting bracket connected to said vehicle for supporting said cables, a second bracket connected to said vehicle for supporting said cables, a second arm having first and second ends, the said first cable connected to the first end of the second arm, the said second cable connected to the second end of the second arm, the second arm; and being pivotally mounted between said first and second ends, said second arm being rotatable by said cables, a rod operatively connected to said second arm and moving generally linearly in response to rotation of said second arm, a link pivotally connected to said rod at one end and to said pedal at a second end.

5. A push-button actuation system for a vehicle transmission comprising in combination:

a vehicle;

an actuator connected to said vehicle for manipulation by an operator;

a power source mounted to said vehicle;

a secondary motor connected to said vehicle operatively connected to said power source and movable in response to the operation of said actuator;

a transmission mounted to said vehicle;

a linkage mounted to said vehicle for transmitting movement from said secondary motor to said transmission;

a pedal in operative relationship to said transmission for causing said transmission to shift gears; and wherein said linkage includes a first arm having first and second ends connected to said secondary motor between said first and second ends and being rotatable thereby, a first cable connected to said first end of said first arm, a second cable connected to said second end of said first arm, a first mounting bracket connected to said vehicle for supporting said first cable, a second mounting bracket connected to said vehicle for supporting said second cable, and a link having first and second ends, said first end of said link being connected to said first cable and said second end of said link being connected to said second cable, said link; having a middle portion operatively connected to said transmission for transmitting motion of said cables to said transmission.

6. A push-button actuation system for a vehicle transmission comprising in combination:

a vehicle;

an actuator connected to said vehicle for manipulation by an operator;

a power source mounted to said vehicle;

a secondary motor connected to said vehicle operatively connected to said power source and movable in response to the operation of said actuator;

a transmission mounted to said vehicle;

a linkage mounted to said vehicle for transmitting movement from said secondary motor to said transmission;

a circuit having three relays operatively said secondary motor, said actuator and said power source for operating said secondary motor in first and second directions and for insulating said motor when not in operation; said linkage includes a first rotatable arm connected to said secondary motor and two cables connected to said first rotatable arm, one cable for causing an upshift of gears and the other cable for causing a downshift of gears.

7. A system as claimed in claim 6 wherein:

said linkage includes a second rotatable arm which is connected to said two cables, a rod connected to said second rotatable arm, and a link pivotally connected at one end to said rod and connected at the other end to a transmission shaft which causes gear shifting of said transmission.

8. A system as claimed in claim 6 wherein:

said linkage includes two brackets connected to said vehicle and a link having two ends rotatably connected to a transmission shaft between said two ends for causing gear shifting of said transmission, one of said cables being mounted to one of said brackets and being connected to one end of said shaft connected link and the other of said cables being mounted to the other of said brackets and being connected to the other end of said shaft connected link.

9. A system as claimed in claim 6 including:

two button operated switches for actuating said motor by energizing two of said relays.

10. A vehicle having a manually operated semi-automatic transmission comprising:

a vehicle frame having upper, lower and connecting members;

an engine mounted to said frame;

a semi-automatic transmission in operative relationship to said engine;

a battery in operative relationship to said engine;

a steering mechanism connected to said frame;

a secondary motor connected to said frame;

means for actuating said motor connected to said vehicle at or near said steering mechanism;

a circuit connected to said frame, said actuating means and said battery;

cable means connected to said vehicle frame and said secondary motor for transmitting rotational motion of said secondary motor to said transmission thereby allowing said transmission to shift gears;

a first link having first and second ends and a middle portion connected to said secondary motor at the middle portion and positioned to rotate when said secondary motor is operated; and wherein said cable means includes a first cable connected to said first end of said first link and a second cable connected to said second end of said first link.

11. A vehicle as claimed in claim 10 including:

a front bracket connected to said upper member of said frame for supporting said secondary motor.

12. A vehicle as claimed in claim 11 including:

a second bracket connected to said connecting members of said frame for supporting and guiding said first and second cables.

13. A vehicle as claimed in claim 12 wherein:

said circuit includes three relays for operating said secondary motor in opposite directions and for insulating said motor when not in operation.

14. A vehicle as claimed in claim 13 including:

a third bracket connected to said lower member of said frame for supporting and guiding said first and second cables and for mounting a second link;

a second link having first and second ends and a middle portion connected to said third bracket at said middle portion and positioned to rotate when said secondary motor is operated and wherein said first cable is connected to said first end of said second link and said second cable is connected to said second end of said second link;

a third link fixedly connected to said second link and adapted to move when said second link is rotated;

a rod having first and second ends, said first end being pivotally connected to said third link; and a fourth link being pivotally connected to said second end of said rod, said fourth link being connected to said transmission.

15. A vehicle as claimed in claim 13 including:

first and second cable brackets attached to said frame, said first cable bracket being connected to said first cable and said second bracket being connected to said second cable; and a pivot link having first and second ends and a middle portion, said middle portion being connected to said transmission;

a first finger pivotally connected to said first end of said pivot link; and a second finger pivotally connected to said second end of said pivot link.

16. A vehicle as claimed in claim 14 including:

a pedal connected to said transmission and to said cables.

17. A vehicle as claimed in claim 15 including:

a pedal connected to said transmission and to said cables.

* * * * *